United States Patent
Parker et al.

(10) Patent No.: US 6,662,632 B1
(45) Date of Patent: Dec. 16, 2003

(54) LINED TANK EQUIPPED WITH LEAK DETECTION AND MONITORING SYSTEM

(76) Inventors: Larry L. Parker, 4250 Green Acres Dr., Ooltewah, TN (US) 37363; Norman L. Parker, 1627 W. Colorado St., Hixson, TN (US) 37343; Terry L. Parker, 2180 Captains Walk, Vero Beach, FL (US) 32963

( * ) Notice: Subject to any disclaimer, the term of this patent is extended or adjusted under 35 U.S.C. 154(b) by 0 days.

(21) Appl. No.: 10/266,246

(22) Filed: Oct. 8, 2002

(51) Int. Cl.[7] ................................................. G01M 3/04
(52) U.S. Cl. ........................... 73/40; 73/49.2; 340/605; 340/604
(58) Field of Search ..................... 73/40, 49.2; 340/605, 340/604

(56) References Cited

U.S. PATENT DOCUMENTS

| | | | |
|---|---|---|---|
| 3,252,155 A | 5/1966 | Surtees et al. .............. | 340/242 |
| 4,110,739 A | * 8/1978 | Kidd .......................... | 340/605 |
| 4,161,689 A | 7/1979 | Schlosberg et al. ........... | 324/54 |
| 4,871,081 A | 10/1989 | Ershig ........................ | 220/5 A |
| 4,939,833 A | 7/1990 | Thomas ........................ | 29/401 |
| 4,974,739 A | 12/1990 | Gelin ......................... | 220/5 A |
| 5,002,195 A | 3/1991 | Lasson ........................ | 220/5 A |
| 5,096,087 A | 3/1992 | Thomas ........................ | 220/561 |
| 5,191,785 A | 3/1993 | Kidd et al. .................. | 73/49.2 |
| 5,378,991 A | 1/1995 | Anderson et al. ............. | 324/557 |
| 5,535,618 A | * 7/1996 | Konieczka .................... | 73/49.3 |
| 5,597,948 A | 1/1997 | Sharp ......................... | 73/49.2 |

OTHER PUBLICATIONS

John G. Lee, "Preleak Detection Systems for Dual Laminate Equipment—A User's Perspective," Sep., 2000; pp. 84–88.

* cited by examiner

Primary Examiner—Hezron Williams
Assistant Examiner—André K. Jackson
(74) Attorney, Agent, or Firm—Alan Ruderman; Stephen J. Stark; Miller & Martin LLP

(57) ABSTRACT

Accordingly, a tank, preferably on a wheeled vehicle such as a railcar or trailer, is provided with a protective liner. Two electrodes are preferably permanently mounted within the tank and respectively connected to a monitor. Another two ground connections are made from the monitor to the tank. At least one of the two probes in the tank are utilized with the monitor to measure the voltage between the tank and the selected probe. When the tank is filled with an ionic solution, a breach of integrity of the liner results in a voltage corresponding to the difference in potentials of the metals forming the probe and tank is read by the monitor. This triggers an alarm. Furthermore, the monitor provides a voltage or current from probe to probe, probe to shell, and shell to shell on a periodic basis to measure and then record the performance of the liner. The equivalent resistance of the liner will be recorded in a memory of the monitor which may be downloaded to a computer for monitoring the performance of the liner. Any breaches of the liner whether obtained from the galvanic cell measurement or resistance measurement are provided to an alarm.

17 Claims, 1 Drawing Sheet

LINED TANK EQUIPPED WITH LEAK DETECTION AND MONITORING SYSTEM

BACKGROUND OF THE INVENTION

1. Field of the Invention

This invention relates to a lined storage tank equipped with a leak detection and monitoring system, and more particularly a leak detection and monitoring system for use with ionic solutions stored in mobile storage tanks.

2. Prior Art

Over the road tanks, such as tanks carried by tractor trailers and rail cars, are often utilized to carry ionic solutions from one place to another. Some of the solutions are hazardous, and could dissolve through the steel or aluminum tanks if exposed to them. Accordingly, a liner is utilized to line the inside of the tanks to prevent exposure of the transported solution with the metal making up the tank.

Over time, and especially if solutions are carried which are incompatible with the lining in the tank, the lining may wear out. When the solution contacts the metal tank, it may start a chemical reaction to rapidly corrode a hole through the tank which could result in a spill of hazardous material. Avoiding this problem is a concern for over-the-road transportation companies.

Presently, there are two primary ways which are utilized to test over-the-road tanks for leaks when full of liquid. First, a conductivity test may be conducted. A Milliamp (mA) meter is connected to a battery (a direct current source), such as a five volt battery. The meter may be a Simpson analog meter, or any other suitable device. The meter is put into test mode and adjusted until it reads 3 mA. The meter is then connected to a probe which is placed in a liquid and the other connection is grounded to the rail car, or shell of a tank. The test button is then pushed and if the reading is higher than 3 mA, a leak is present, but if it is lower than 3 mA, no leak is reported.

The conductivity test is not a particularly precise test and it provides little advance warning before having a relatively large problem. Additionally, the test is performed by taking an access cover off the top of the tank, and dropping an electrode into the transported solution. Many items inadvertently end up in a tank including watches, wrenches, bolts, etc. . . . over time when the tanks have an exposed opening. Furthermore, since the system operates on direct current, the possibility of polarization exists, as the resistant increases, the current decreases. Polarization of the probe occurs through use which would provide indications that the liner is good, while actually defective. If the operator were aware of the polarization, the leads could be reversed, but a need exists for a monitoring system which does not necessarily rely on the skill or experience of the employee to operate properly. A large spill could subject the transportation company to large liabilities.

The second way commonly utilized to test tank liners is to perform a megohm (megger) check where a large voltage is applied across a first electrode placed in the solution in the tank, and another electrode is placed in contact with the tank (opposite the liner) from the first electrode. The current passing through the electrodes is measured and a resistance value is provided for the "circuit", i.e., through the liner. If the resistance drops below a certain value, such as 10,000 ohms, then a leak is present. If above, the cutoff, then no leak is present.

The problem with the megger test is that the resistance measured is not direct resistance but an equivalent resistance through all parallel circuits. Accordingly, if a pin hole leak were present offering a minimal amount of resistance, such as 0.1 ohms and the remainder of the liner provided excellent resistance such as 10,000 ohms, then in a large tank, the equivalent resistance may be on the order of 9,000 ohms, which would not be reported as a leak.

The most accurate way presently utilized to check for leaks in an empty tank is to perform a spark test. A probe having 15,000 volts is passed across the liner. If a leak is found, even a pin hole leak, a visible spark travels from the probe through the hole to the tank. The problem with this method is that most liners are applied in sheets like wallpaper and overlap adjacent sheets. The spark will not travel very far between two sheets, while a leak may travel a few feet through the adjacent liner layers to the tank wall. Government Regulation No. 4 M 183 requires a certified inspector to perform this check and DOT requirements require the test to be performed yearly on tractor trailer tanks. There are no known regulations addressing rail car tests.

Accordingly, a need exists for a leak detection system for use with tanks, especially mobile tanks.

SUMMARY OF THE INVENTION

It is an object of the present invention to provide a lined tank equipped with a monitor able to detect very small leaks in a liner.

It is another object of the present invention to provide a method and apparatus for monitoring and recording data relating to the performance of a tank liner.

Another object of the present invention is to provide an alarm to an operator of a vehicle in the event of a breach of a liner in a mobile tank.

Another object of the present invention is to provide a regular monitoring of a lined tank to check for a breach in the integrity of a liner.

Another object of the present invention is to utilize the natural potential difference between dissimilar metals to provide a voltage in the event of a breach of a liner.

Another object of the present invention is to provide a method and apparatus for monitoring a mobile lined tank for breaches in the liner when the tank is filled with an electrically conductive liquid.

Accordingly, a tank, preferably on a wheeled vehicle such as a railcar or trailer, is provided with a protective liner. Two electrodes are preferably permanently mounted within the tank and respectively connected to a monitor. Another two ground connections are made from the monitor to the tank. At least one of the two probes in the tank are utilized with the monitor to measure the voltage between the tank and the selected probe. When the tank is filled with an ionic solution, a breach of integrity of the liner results in a voltage corresponding to the difference in potentials of the metals forming the probe and tank is read by the monitor. This triggers an alarm. Furthermore, the monitor provides a voltage from probe to probe, probe to shell, and shell to shell on a periodic basis to measure and then record the performance of the liner. The effective or equivalent resistance of the liner will be recorded in a memory of the monitor which may be downloaded to a computer for monitoring the performance of the liner. Any breaches of the liner whether obtained from the galvanic cell measurement or equivalent resistance measurement are provided to an alarm.

BRIEF DESCRIPTION OF THE DRAWINGS

The particular features of the invention as well as other objects will become apparent from the following description taken in connection with the accompanying drawings in which.

DETAILED DESCRIPTION OF THE PREFERRED EMBODIMENT

While various substances may be transported in liquid form, the particular solutions of concern with the system described herein are ionic in nature. While almost everyone is familiar with the ability of solid conductors to carry electricity, some solutions also conduct electricity. These electrically conductive liquids utilize the principle of ion conductance and include such solutions as water (except not ultrapure water), milk, most acids, bases and salts, including, but not limited to, hydrochloric acid, sulfuric acid, hydrobromic acid, sodium hydroxide, sodium chloride, etc. . . . When each of these solutions are diluted with water, they can conduct electric current through ion conductance. Gasoline, alcohols and most hydrocarbons are not electrolytic solutions.

Another electrical principle which is utilized by the present invention is the electrical potential which exists between dissimilar metals. A voltage difference exists between metals of two different chemical compositions. Two metals may be selected so that the potential between them is significant enough to be measured. When they are in electrical contact with one another, such as through an electrically conductive liquid, a galvanic cell is created and current flows from the higher to the lower potential. This current and voltage can be measured.

A lined tank containing an electrically conductive ionic solution, with an intact liner and with no electrodes present, is not an electrochemical cell. This is the usual non-test condition of a loaded lined tank such as a trailer, lined car, or stationary lined tank. It would be very difficult to detect electrical characteristics with no electrode located within the tank.

When electrodes are submerged in the fluid in the tank, either temporarily or permanently, as long as the fluid is an electrically conductive ionic solution, and then connected to an external power source whose electromotive force is stronger than the electromotive force exerted by the cell, the lined tank can then be considered to be an electrolytic electrochemical cell.

When a breach occurs in the lining of the tank, a portion of the electrode is exposed to a portion of the steel shell, but no outside electromotive force is present or the outside electromotive force is less than that exerted by the cell, the tank can then be described as a galvanic or voltaic electrochemical cell.

Figure 1:
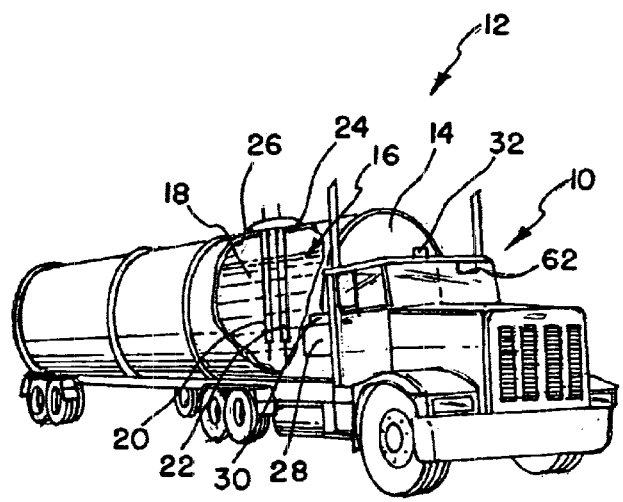
FIG. 1 is a perspective view of a tank supported by a trailer and driven by a truck with the tank equipped with a monitoring system according to the preferred embodiment of the present invention.

Referring to FIG. 1, a tractor trailer truck 10 is illustrated with a trailer 12 in tow. The trailer 12 has a tank supported thereon. Tanks 12 are often utilized to carry various liquids ranging from gasoline to milk to acids, etc. The truck and trailer 10,12 are preferably utilized together to house portions of a leak monitor system according to the preferred embodiment.

The trailer 12 carries a tank 14 thereon. The tank 14 has an airtight chamber 16 therein. Since the majority of liquid chemicals utilized with the teachings of this disclosure are somewhat toxic, especially in quantity, a sealed tank 14 is believed to be a feature of the preferred embodiment. Inside chamber 16 is stored a quantity of electrically conductive liquid 18.

First and second probes or electrodes 20,22 extend from an access hole 24 into the cavity 16 of the tank 14. Preferably, the electrodes extend toward the bottom of the tank so that a significant quantity of liquid 18 need to be contained for the electrodes 20,22 to be submerged. The tank 14 has a liner 26 which surrounds the cavity 16. It is preferably for the liner 26, or non-conductive material to also extend up into the access holes 24 as well. Otherwise when liquid 18 sloshes as is likely to occur during transport, if conductive portions of tank are exposed to the liquid 18, alarms can be triggered as explained in detail below since the electrodes 20,22 would be in contact with the conductive tank portions.

Figure 2:
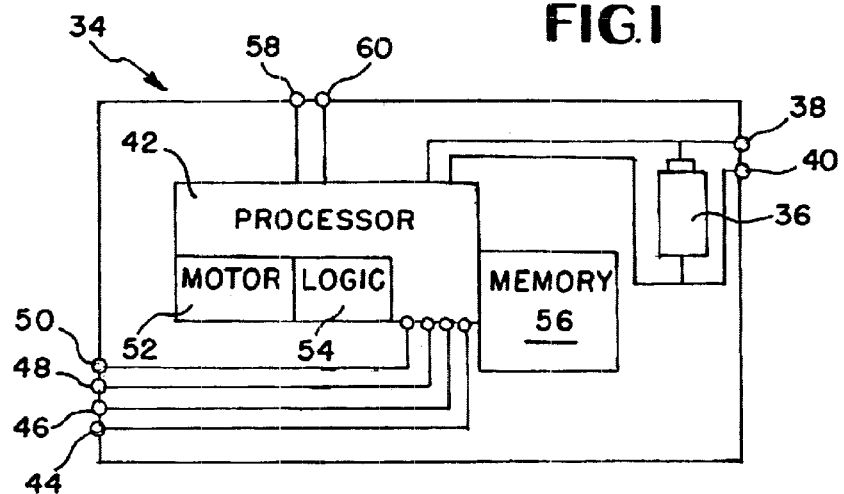
FIG. 2 is a circuit schematic of a presently preferred monitoring system.

The electrodes 20,22 are connected to a monitor, shown in FIG. 2, which is preferably housed on the trailer 12. With the monitor 28 housed in a weather proof and tamper proof housing 28, a history of the contents of the trailer may be monitored. The monitor 28 is also connected to grounds 30,32 on the tank 14. It is important that the grounds 30,32 be in electrical contact with the metal of the tank and not hindered by paint or other coating. In the preferred embodiment, the tank was sanded with a grinder and the grounds 30,32 were welded to the exposed tank portions. A lead from each of the grounds 30,32 was then connected to the monitor 34.

The first and second electrodes are preferably selected so that they can withstand the harsh environment they will be subjected to in the liquid 18 in the tank 14. A carbon probe for electrodes 20,22 has a sufficient potential difference from steel (iron) in the tank 14. For most electrolytes (electrically conductive solutions) used as liquid 18, about 1 volt of potential would be formed in the event of a liner breach so as to place the electrode 20 or 22 in electrical contact through liquid 18 with tank 14, and thus ground 30,32.

FIG. 2 shows a schematic of the monitor 34. The monitor may have an internal power source 36, such as in the form of batteries or otherwise. The preferred embodiment also has terminals 38,40 which connect with the power source of the vehicle 10. While this would be 12 volts DC in a tractor trailer rig or rail car, it could be 120 V AC or other source. A transformer may also be included to step voltage from the vehicle power source to the internal power source voltage. Recharging of the internal power source 36 is believed to be advantageous so that the monitor 34 can operate as long as possible when the trailer 12 is disconnected from a vehicle 10. Of course the terminals 38,40 may also have the capability of connecting to a stationary source, such as an extension cord connected to an outlet.

The power source 36 drives a processor 42 which receives leads 44,46,48,50 which are respectively connected to the first and second electrodes 20,22 and the grounds 30,32. The processor 42 may have a meter 52, no meter, or otherwise be equipped to measure voltage and/or resistance current, a logic portion 54, and a memory 56 connected thereto. The monitor 34 also has communication ports 58,60 which provide a way to access the data retained in memory 56, instruct the processor 42 to perform specific commands, and to receive alarm signals sent to the remote indicator 62 shown in FIG. 3. Communication ports 58,60 may communicate with devices such as infrared devices, radio transmitter/receiver signals, cell phone technology such as General Packet Radio System (GPRS), or other protocol. Of course, the monitor 32 could be located in the vehicle 10 rather than on the trailer 12 in some embodiments, and the remote indicator 62 could be integral, attached or otherwise proximate to the monitor 32.

The processor 42 is preferably configured to be able to perform at least two subroutines in with the logic portion 54. It is preferred that the processor 42 be a custom designed microprocessor based device, but other components may be utilized in other embodiments. The first subroutine is the reading of voltage between the first electrode 20 which provides an input at lead 44 and a ground, 30 or 32, which provides an input at one of leads 48,50. The meter 52 reads the voltage between the leads 44, and 48 or 50. When the liner 24 is not breached, there is no voltage difference expected. However, if the liner 24 is breached a voltage will be recorded by the processor 42. If the processor 42 reads greater than a predetermined setting, such as about 0.6 volts DC, then an alarm condition is satisfied and a signal is sent from the processor, out of the communication port 58 to the remote indicator 62 to alert an operator of the vehicle 10. The process may then be repeated for leads 46, and the other of 48,50.

Since the tank 14 is an airtight enclosure about the cavity 16, even humid or moist air filled with electrolye solution has been found to be a satisfactory conductor to indicate a liner 26 breach. The voltage reading may be stored in memory 56 for later use and/or retrieval from the communication port 58, however in the preferred embodiment, this subroutine is utilized to drive a red alarm signal 64, in the event of a liner 26 breach, on the remote indicator 62.

While some monitor embodiments may be limited to taking voltage readings across some or all of leads 44,46, 48,50, other monitor embodiments may also provide a known voltage across some of the leads 44,46,48,50 as will be explained in detail below. Since voltage equals resistance multiplied by current, the application of a known current while measuring the voltage allows the processor 42 to calculate a resistance value for the effective resistance through the liner 24.

Various electrolytic solutions will have different conductivity readings depending on the amount of ions dissolved in solution. For instance a solution of sodium hydrochloric acid might have a conductivity reading of 0.85 while a solution of sodium hypochlorite might have a conductivity reading of 1.42 and a solution of sodium hypochlorite might have a conductivity reading of 1.5. In general the less conductive a solution is, the more resistive that solution will be to conducting current. Accordingly, in the event of a liner 24 breach, a less conductive fluid 18 will report a higher effective resistance value than a reading taken when the tank 14 contains a fluid 18 having a higher conductivity.

The second subroutine of the processor 42 is the calculation of the resistance. The processor 42 preferably records the time and date. An internal clock (not shown) may be utilized. Next a reading is taken probe-to-probe. A known current is applied across leads 44,46, the voltage is measured by the processor 42 and the resistance value is calculated and recorded. When there is no liquid 18 in the tank 14, this resistance value will be higher than when liquid connects the two electrodes 20,22 together in the cavity 16.

Next a probe-to-tank reading is taken across leads 44 or 46 and 48 or 50. Once again the resistance is calculated and recorded. Finally, a tank-to-tank reading is taken across leads 48,50. It is expected that the tank to tank reading will be near zero, and if a higher resistance is obtained, an open circuit exists along one of the leads 48,50 extending to the grounds 30,32 on the tank 14.

It is preferable to use alternating current as opposed to direct current signals due to the preferable feature of somewhat continuously monitoring cell resistance. Measurements of ionic conduction are normally made with AC techniques to avoid complications due to the Faradaic processes taking place at the electrodes. If a direct current is imposed upon a chemical cell, chemical reactions will occur at the electrodes in accordance with Faraday's laws. If an alternating current rather than a direct current is used, that Faradaic reaction which takes place on one half-cycle is reversed on the following half cycle. If, in addition, no product can escape from the inter phase regions, no net Faradaic current can flow. There are still flows of current, however, and such currents, which do not produce chemical changes in materials, are called non-Faradaic current.

The probe-to-probe measurement involves electronic conductance from the monitor 34 to the electrode surface 20,22. This is in series with the many parallel circuits ionic conductance through the electrolye solution 18 to the surface of the other probe. This is also in series with the electronic conductance from the probe surface back to the monitor 34. With the next signal, the probe-to-probe circuit is reversed. Since the surface areas exposed to the electrolyte are constant, the equivalent resistance of circuits does not vary appreciably.

The probe-to-tank circuit involves electronic conductance from the monitor 34 to the surface of the electrode 20,22. This is in series with the many parallel circuits of ionic conductance through the electrolyte to the inside of the liner. This is then in series with the electronic conductance through the liner to the inside of the tank. Then this is in series with the electronic conductance through the tank and back to the monitor 34. With the next signal, the probe-to-tank is reversed. A decrease in resistance is observed upon filling and an increase in resistance is observed upon pumping out the fluid 18.

The tank-to-tank circuit involves electronic conductance form the monitor 34 to the tank 14. This is in series with the electronic conductance through the tank and then in series with the electronic conductance back to the monitor 34. With the next signal, it is preferable to reverse the polarity of the signal sent.

The impedence of both the probe-to-probe and probe-to-tank circuits is thought to involve the following circuit constants, inductive reactance, equivalent resistance of a parallel circuits and capacitive reactance. They are in series. The measuring of the equivalent resistance is the intended measurement to be made, but it is difficult to separate the three.

In the preferred embodiment the signal strength output of the monitor is only a few milliamps, the frequency is less than about 60 Hz and the maximum regulated voltage is less than six volts. The coefficient of self inductance may be known in some embodiments, but has not been calculated in test devices. Furthermore, the instantaneous counter emf due to inductance has not been calculated.

In any event when reading the full scale, the maximum output voltage of five volts is not reached when the maximum circuit impedance is reached, thus indicating that the two circuit constants inductive reactance and capacitive reactance are preferably maintained small or otherwise accounted for.

An advantage of using processor 42 is to have the ability to switch probe-to-tank readings between electrodes 20,22 in the tank 14 as well as direct which terminal, positive or negative is supplied to each of the leads 44,46,48,50 so that polarization of any of the electrodes 20,22 or grounds 30,32 does not occur.

The processor 42 preferably repeats the resistance check on a first periodic basis and records values for retrieval on a second periodic basis in the memory 56. Of course, the first and second periodic bases could be the same interval, but they need not in all embodiments.

Figure 3:
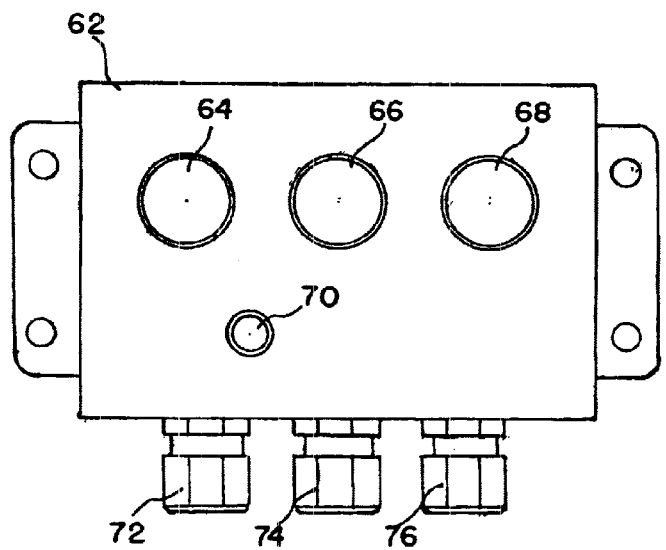
FIG. 3 is an indicator used in the presently preferred monitoring system.

The preferred remote indicator 62 is shown above the driver's seat in FIG. 1 and in detail in FIG. 3. Of course, the indicator 62 may be a portion of the monitor 34 as well. The red light 64 flashes or stays steady on an alarm condition, such as if the conductivity reading from a probe-to-tank reading drops below a limit. The limit may or may not be adjustable depending upon the liquid 18 in the tank. The probe-to-probe reading may be utilized to calculate the limit as it will correspond to the conductivity (as measured by resistance) of the fluid 18. When the limit is dropped below, the alarm signal is triggered and the light 64 or other indicator alerts the operator or other person. The yellow light 66 is utilized to indicate a fault in the system, such as if ground-to-ground readings are not near zero. A problem exists with the system. Finally, the green light 68 may be utilized to indicate normal operation of the system as well as the liner apparently operating as designed. A push to test button 70 may be utilized to insert a short across the probe-to-tank test so that the red light 64 will indicate, but it is preferred that no record be made of this event.

Different readings may be obtained from the monitor 34 and printed out. Furthermore, a graph may be made of data. An RS 232 download may be performed on the memory portion of the monitor 34. E-Prom, programmable memory or other memory storage may be utilized. If the remote indicator 62 is part of the monitor 34, input and output 72,74 may correspond to the communication input and output ports 58,60 on the monitor 34 and connector 76 may be used for a power supply inlet and/or a communication terminal for use with a computer.

The tanks are equipped with liners 24 which may be rubber, whether natural or synthetic, frp (fiberglass reinforced plastic), pvc (polyvinyl chloride), coatings of 10 mil or greater such as may be sprayed or rolled, high baked phenolics, vinyl esters, epoxy, fluorinated hydrocarbon resins or other non, or low conductive liner 24.

The preferred monitor 34 is capable of operating in various modes, either automatically or on command. It performs a galvanic voltage check as described above. It also is utilized to calculate the resistance across the liner 24 as described above. Finally, if voltage is induced, it may be reversible to operate with a system switching from an electrolytic to a galvanic cell. The voltage or current may be supplied to read a null and whenever it switched to voltaic conditions, a reading would be recorded and whenever it switched to generating conditions a voltage could be recorded.

The monitor 32 also conditions and controls the frequency and level of various electrical output and input signals through leads 44,46,48,50, scans the system circuits for electrical continuity and faults, processes and retains pertinent data in memory for alarm events and data acquisition, and initiates alarms in the event of a continuity or a leak failure is detected. Tests may be performed every few seconds or at other desired frequencies. The monitor 34 may require a plurality, such as three, occurrences in a row of exceeding a predetermined limit to report a fault or alarm condition.

Numerous alternations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A lined tank equipped with a monitoring system comprising:

a tank having a cavity surrounded by an air tight conductive shell;

a liner intermediate the cavity and the shell about the volume of the shell;

a first electrode located within the cavity of the tank;

a first ground connected to the shell of the tank;

a monitor connected by a first lead to the first electrode and a second lead to the ground, said monitor having a processor, said processor measuring the voltage between the first electrode and the ground and then comparing the measured voltage to a predetermined limit, and if the measured voltage exceeds the predetermined limit, activating an alarm condition;

a power source connected to the monitor, said power source providing an electrical signal to the first electrode relative to the first ground, said processor securing from the measurement of the voltage between the first electrode and the first ground, and determining an effective resistance intermediate the electrode and the first ground, and if the effective resistance drops below a limit, activating the alarm condition;

a second electrode located within the cavity of the tank and separated by a portion of the cavity of the tank from the first electrode, and said processor also determines a resistance value intermediate the first and second electrode through the portion of the cavity of the tank; and an indicator, said indicator indicating an alarm condition upon receipt of a signal from the monitor.

2. The lined tank of claim 1 wherein the monitor further comprises a memory, and the electrical signal is applied on a first periodic basis with a recording of the effective resistance recorded in the memory.

3. The lined tank of claim 2 wherein a time and a date which is stored in the memory with the equivalent resistance as data.

4. The lined tank of claim 3 wherein the monitor further comprises at least one communications port providing access to the data in the memory.

5. The lined tank of claim 2 wherein the electrical signal is also applied on a second periodic basis.

6. The lined tank of claim 1 wherein the power source provides alternating current to one of the first electrode and the first ground.

7. A lined tank equipped with a monitoring system comprising:

a tank having a cavity surrounded by an air tight conductive shell;

a liner intermediate the cavity and the shell about the volume of the shell;

a first electrode located within the cavity of the tank;

a first ground connected to the shell of the tank;

a monitor connected by a first lead to the first electrode and a second lead to the ground, said monitor having a processor, said processor measuring the voltage between the first electrode and the ground and then comparing the measured voltage to a predetermined limit, and if the measured voltage exceeds the predetermined limit, activating an alarm condition;

a power source connected to the monitor, said power source providing an electrical signal to the first electrode relative to the first ground, said processor securing from the measurement of the voltage between the first electrode and the first ground, and determining an effective resistance intermediate the electrode and the first ground, and if the effective resistance drops below a limit, activating the alarm condition;

a second ground, and said processor determines a resistance value intermediate the first and second grounds, and if said resistance value exceeds a predetermined value, said processor triggers a fault condition, and said alarm indicator indicating a fault condition upon receipt of a fault condition signal from the monitor; and an indicator, said indicator indicating an alarm condition upon receipt of a signal from the monitor.

8. The lined tank of claim 1 wherein the liner is selected from the group of natural rubber, synthetic rubber, frp, pvc, high baked phenolic, vinyl ester, epoxy or fluorinated hydrocarbon resin liners or coatings.

9. The lined tank of claim 1 wherein the tank is supported on wheels.

10. The lined tank of claim 9 wherein the monitor is physically supported by the wheels supporting the tank, and the indicator is located remotely from the monitor.

11. The lined tank of claim 10 wherein the indicator is located in a cab of a vehicle.

12. A monitoring system for use with lined tanks storing electrolytic fluids comprising:

a tank having a substantially airtight cavity therein surrounded by a shell;

a liner intermediate the shell and the cavity normally preventing fluid communication from the cavity to the shell;

a probe extending into the cavity from an access hole in the tank and having a first electrode connected thereto;

a first ground connected to the tank;

a monitor having a processor therein and a first and second lead communicating with the processor; said monitor in electrical communication through a first lead with the first electrode, said first ground in electrical communication through a second lead with the monitor, said monitor having a processor configured to take a reading from the first and second leads and compare the reading to a predetermined limit, and if the reading passes the predetermined limit, triggering an alarm condition; and a second ground on the tank and a fourth lead in electrical communication with the second ground, said fourth lead connected to the monitor, and said processor providing a voltage across the second and fourth leads and providing a third reading, said third reading causing a fault condition if a second predetermined limit is passed, and said indicator providing indication of the fault condition.

13. The monitoring system of claim 12 wherein the tank is on wheels, and the monitor is also supported by the wheels.

14. The monitoring system of claim 12 wherein the first reading taken is a galvanic voltage.

15. The monitoring system of claim 12 wherein the processor provides a voltage through the leads across the first electrode and first ground and the reading is one of a current and a resistance.

16. The monitoring system of claim 12 wherein the processor provides a voltage across the first and second electrodes to obtain the second reading.

17. The monitoring system of claim 12 wherein the reading is recorded along with a time.

* * * * *

UNITED STATES PATENT AND TRADEMARK OFFICE
CERTIFICATE OF CORRECTION

PATENT NO.    : 6,662,632 B1                                               Page 1 of 1
DATED         : December 16, 2003
INVENTOR(S)   : Parker et al.

It is certified that error appears in the above-identified patent and that said Letters Patent is hereby corrected as shown below:

<u>Drawings,</u>
Figure 2, the element illustrated as element 52, should be -- meter -- instead of "motor".

Signed and Sealed this

Second Day of March, 2004

JON W. DUDAS
*Acting Director of the United States Patent and Trademark Office*